United States Patent
Parker et al.

[11] Patent Number: 6,104,358
[45] Date of Patent: Aug. 15, 2000

[54] LOW COST DEPLOYABLE REFLECTOR

[75] Inventors: A. Dale Parker, Rolling Hills Estates; L. Dwight Gilger, Rancho Palos Verdes, both of Calif.

[73] Assignee: TRW Inc., Redondo Beach, Calif.

[21] Appl. No.: 09/076,401

[22] Filed: May 12, 1998

[51] Int. Cl.⁷ ............................................... H01Q 15/00
[52] U.S. Cl. ............................................................ 343/915
[58] Field of Search ............................. 343/915, 916; H01Q 15/00

[56] References Cited

U.S. PATENT DOCUMENTS

| | | | |
|---|---|---|---|
| 3,360,798 | 12/1967 | Webb | 343/915 |
| 3,521,290 | 7/1970 | Bahiman | 343/915 |
| 3,599,218 | 8/1971 | Williamson | 343/915 |
| 3,670,358 | 6/1972 | Schwartz | 343/915 |
| 4,030,103 | 6/1977 | Campbell | 343/915 |
| 4,769,647 | 9/1988 | Herbig et al. | 343/915 |
| 4,845,511 | 7/1989 | Grayson et al. | 343/915 |
| 5,239,793 | 8/1993 | Chiappetta | 343/915 |
| 5,488,383 | 1/1996 | Friedman | 343/915 |

*Primary Examiner*—Michael C. Wimer
*Attorney, Agent, or Firm*—Michael S. Yatsko; Ronald M. Goldman

[57] ABSTRACT

A deployable reflector having an umbrella-like structure in which a plurality of tubular parabolically curved ribs are connected end-wise to a central hub by associated strain energy hinges, which are flexible and spring-like in characteristic, creating a spring force when stressed. A thin pliant metal coated film material is shaped for expansion into a parabolic shape serves as the reflective surface. Rib anchors, suitably radially extending pockets, attached to the backside of the material receive the ribs that radially extend from the hub. When stowed and restrained, such as by a cable, the curved ribs are all held down, collapsing the parabolic shape of the material, and stressing the hinges, which produce a counter-biasing force. When the restraining force is released to deploy the reflector, the biasing force created in the spring-like flexible hinges automatically pivots the ribs outwardly, pulling the material into its parabolic shape.

16 Claims, 3 Drawing Sheets

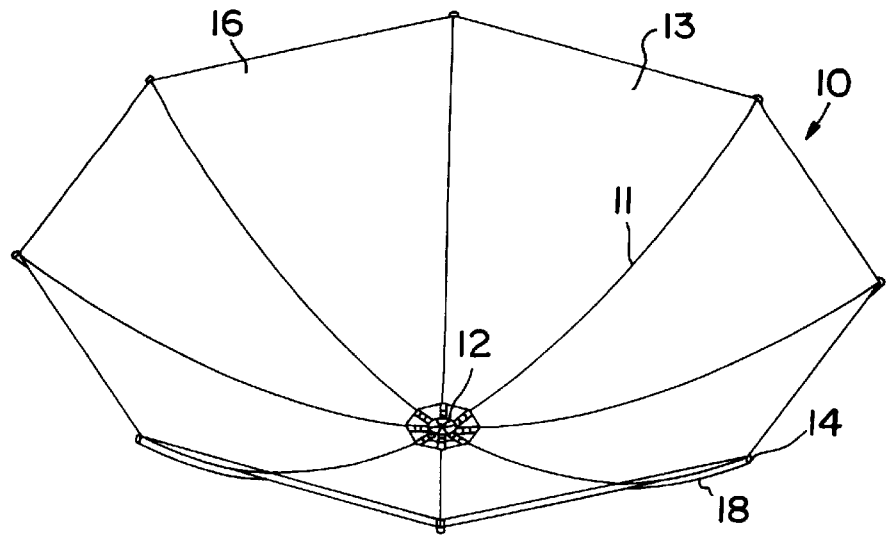
FIG. 1
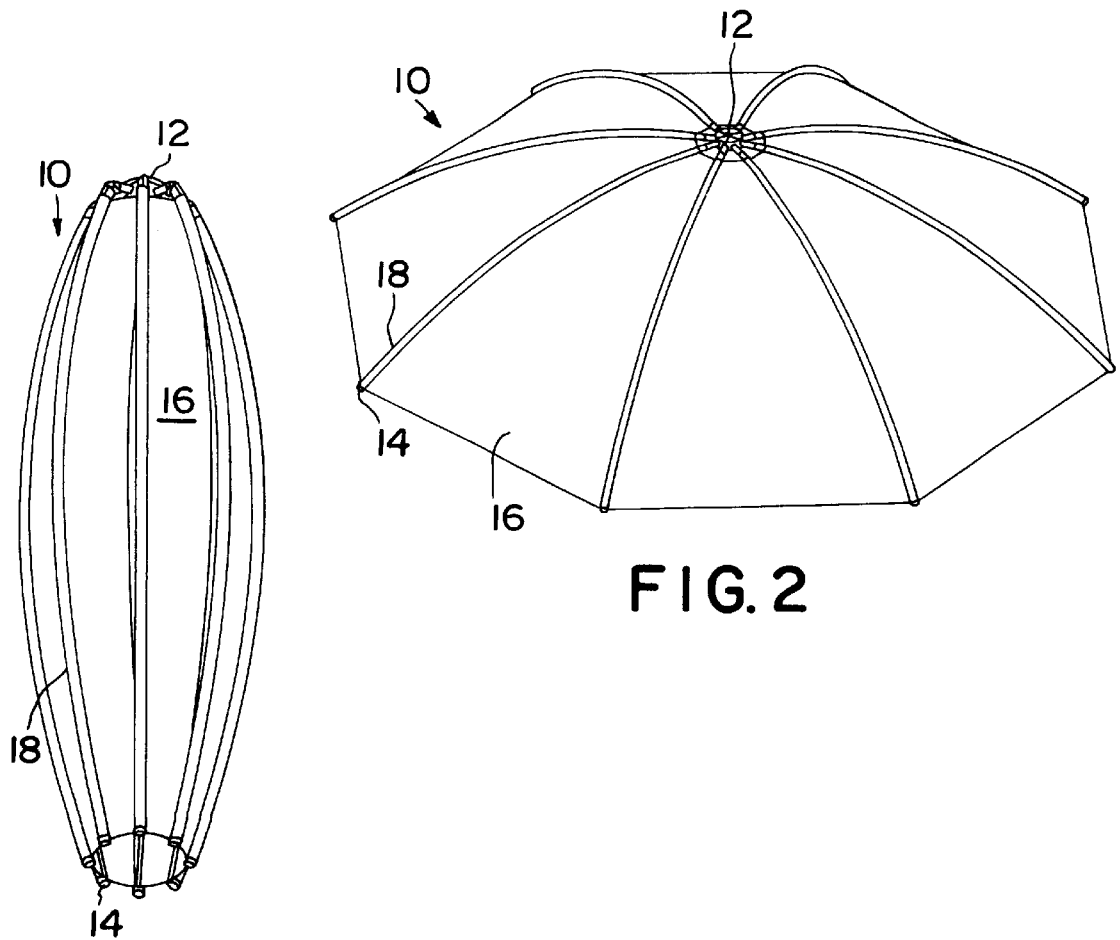
FIG. 3
FIG. 2

LOW COST DEPLOYABLE REFLECTOR

FIELD OF THE INVENTION

This invention relates to deployable reflectors for high frequency microwave parabolic antennas, and, more particularly, to a simplified structure for a P-band antenna reflector that is capable of construction at a relatively low manufacturing cost.

BACKGROUND

A parabolic reflector is a constituent element of a microwave frequency parabolic antenna. Taking advantage of the unique property of that dish shaped reflective surface, wherein RF energy incident at any location on the surface is reflected to the parabola's focal point, the antenna's feed component is located at the surface's focal point. As a consequence, the more diffuse essentially spatially displaced RF fields propagating through space and incident at displaced positions on the reflector are concentrated or focused to a single point, thereby producing a more intense RF field at that point. That advantage permits intelligible reception of weaker RF signals than otherwise could be detected. For the foregoing reason and other reasons well known to those skilled in the art, the parabolic antenna is widely used in communications systems, including those found in space vehicles.

In space vehicle application those antennas are "deployable". That is, the antenna is constructed of a structure that may be collapsed or folded up into a package of small volume, suitable for stowage in the limited space available on board a space craft. It may then be expanded to a much larger size structure, following launch and orbital positioning of that space craft.

RF Deployable parabolic reflectors in space vehicle application typically employ a reflective cloth-like fabric as the reflective surface typically constructed of a cross hatch of wires welded together at the intersections or knitted gold plated molybdenum wire. The reflective fabric is light weight and pliant in nature, so it may be compacted as part of the stowed package. When the reflector is deployed, the fabric is stretched out taut by the associated supports to form a parabolic curved surface.

One such prior deployable reflector incorporates an umbrella-like foldable structure, which, like an umbrella, unfolds radially outwardly extending spokes of longitudinally curved geometry that supports the pliant cloth-like metal mesh reflective surface and stretches the reflective fabric into the required parabolic shape. The ribs are attached at an end with hinges to and are distributed about the periphery of a central joint or hub. For deployment, the ribs are swung radially outward from the central hub, carrying the attached reflective surface and rendering that surface taut. Deployable reflectors of the foregoing kind are known and call to mind the Fltsatcom Transmit antenna manufactured by TRW, Inc., the TDRSS SA antenna manufactured by Harris; and the PAMS reflectors, a TRW, Inc. development.

The profile accuracy of the reflector is dependent upon the wavelength of the RF signal being transmitted or received. Typically the profile is controlled in shape by the number of shaped ribs used in the arrangement. The greater the number of ribs, the smaller the arcuate spacing between those ribs, and the closer the surface geometry of the tautened reflective material supported by the ribs conforms to a paraboloid.

At some frequencies, the extending curved ribs alone are sufficient to adequately shape the reflective surface in the deployed state. At higher frequencies where the wavelength is much shorter, additional shape control devices, referred to as catenaries, are often strung between adjacent ribs at spaced intervals from the central hub. Those catenaries ensure that the portion of the reflective surface located in the interstices between adjacent ribs are held to the proper parabolic shape.

To fit in the stowed envelope for launch, the reflectors fold at the hub, much like the ordinary umbrella. Unlike the ordinary umbrella, however, the hinges connecting the ribs to the hub in the described deployable antenna are somewhat complex structures, which need not be described in detail. The reason for that complexity is that the hinges must carry "launch loads" in the stowed position. Then they are required to deploy the rib to the correct angle so that the rib provides the correct shape for the reflective surface. Once deployed, the hinges must latch or be pre-loaded against mechanical stops to provide sufficient deployed stiffness. The foregoing requirements are satisfied by complexity of the elements, preciseness in shape, and difficulty in manufacturing and integration, which translates to a higher than desired manufacturing cost. As those skilled in the art appreciate, in the abstract the foregoing reflectors are somewhat expensive to manufacture, but serve their purpose well.

A recent trend in reflector use in sensor payloads, such as radars, requires reception of lower frequency ranges, namely P-band, between 400 and 440 MHz, specifically 425 MHz, and at higher UHF frequencies, L-band up to 1.8 GHz. Communications payloads also may operate at those frequency bands. On land, antennas for those frequencies are ordinarily served by the familiar Yagi antenna, containing a radiating element and multiple reflector elements spaced apart and oriented in parallel. An ordinary television antenna is an example of the Yagi type. However, it is also possible to use a parabolic antenna at those lower frequencies.

As those skilled in the art appreciate, designs of antenna structures, including those of the reflectors, may be mathematically scaled up in size, to provide deployable reflectors with improved gain. Unfortunately, scaling in size does not decrease the complexity or cost of the reflector or its hinges. Since these new applications are not critical to life or sovereignty, they command fewer investment dollars. Hence, those applications eschew the expensive existing deployable designs and, to achieve financial viability, desire a less expensive approach, which, until the present invention, was not available.

Accordingly, an object of the invention is to reduce the cost and complexity of manufacturing an off-set parabolic reflector antenna, particularly its deployable reflector.

A further object of the invention is to provide a new deployable reflector design that adapts and combines proven component designs found in other types of antennas to achieve higher reliability.

A still further object is to provide a deployable parabolic reflector that is particularly useful for transmission and collection of RF energy, particularly at P-band and in the UHF frequency regions, whose component elements are more simple in structure and less difficult to manufacture than existing deployable parabolic reflectors for like applications. And an ancillary object of the invention is to provide a like deployable parabolic reflector for concentrating light photons.

SUMMARY OF THE INVENTION

In accordance with the foregoing objects and advantages, the present invention comprises a deployable reflector having an umbrella-like structure in which a plurality of tubular parabolically curved ribs, suitably of graphite material, are connected end-wise to a central hub by associated strain energy hinges, which are resilient and flexible, creating a spring force when stressed. A thin pliant metal coated film material, such as Mylar® polyester film, is shaped for expansion into a parabolic shape that serves as the reflective surface. Radially extending pockets or other rib anchoring devices attached to the backside of the shaped material receive the radially spaced ribs extending radially from the hub positioned in a central opening in that material. When stowed and restrained, the curved ribs are all held down collapsing the material's parabolic shape and stressing the hinges, which produce a counter-biasing force. When the restraining force is released to deploy the reflector, the biasing force created in the resilient flexible hinges automatically pivots the ribs outwardly, and the ribs being anchored to the material pulls the material into its parabolic shape.

The strain energy hinges include a cylindrical mandrel fastened at an end to the hub, and at least a pair of thin flexible members, each having a circularly curved cross section of less than a semi-circle. An end portion of the concavely curved inner surface of the flexible members attaches to the other end portion of the mandrel, are oriented coaxially, symmetrically positioned and attached to diametrically opposite portions of the mandrel's cylindrical wall. The opposite end of the flexible members overhang the mandrel to form a grip for holding an end of a respective rib in spaced relation to the end of the mandrel, leaving an intermediate portion of the flexible members, the portion located between the end of a rib and the end of the mandrel, free to resiliently flex upon pivotal movement of the rib to a folded position. In so flexing, the flexible members produce a biasing force to pivot the rib toward the deployed position.

The present invention recognizes that at the lower frequencies of UHF and P band, the distance between the curved support ribs in the umbrella-like reflector structure is a smaller fraction of the wavelength than at the higher frequencies. As a consequence, the shape or profile of the reflector does not require the same degree of preciseness used in existing high frequency deployable reflectors. Thus, even though minor perturbations in surface contour may reduce the antennas gain slightly in comparison to a mathematically perfect parabolic surface, the reduction is not significant or meaningful. With that recognition, the novel construction assembles various previously known elements found in a number of diverse technologies into a single new combination that is significantly lower in manufacturing cost than prior deployable reflectors.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the drawings:

FIG. 1 is a front view of the reflector as unfolded and deployed;

FIG. 2 is a rear view of the reflector as deployed;

FIG. 3 illustrates the reflector as folded for stowage;

DETAILED DESCRIPTION OF THE PREFERRED EMBODIMENTS

Reference is made to FIG. 1, which illustrates the reflector as deployed and as viewed from the front and to FIG. 2, which illustrates that same reflector from the rear. The two views may be considered concurrently. Much like an umbrella, the reflector contains a central hub 12 from which radially extending longitudinally curved ribs 14 support and stretch a covering sheath of pliant reflective material 16, with the reflective surface 13 being located on the concave parabolic inside, illustrated in FIG. 1.

In the collapsed or folded up condition in which the reflector of FIG. 1 is stored and/or transported, the reflector appears as presented in FIG. 3, which may be briefly reviewed. As shown the curved ribs are folded up extending essentially in the same direction as the axis of hub 12.

Figure 4:
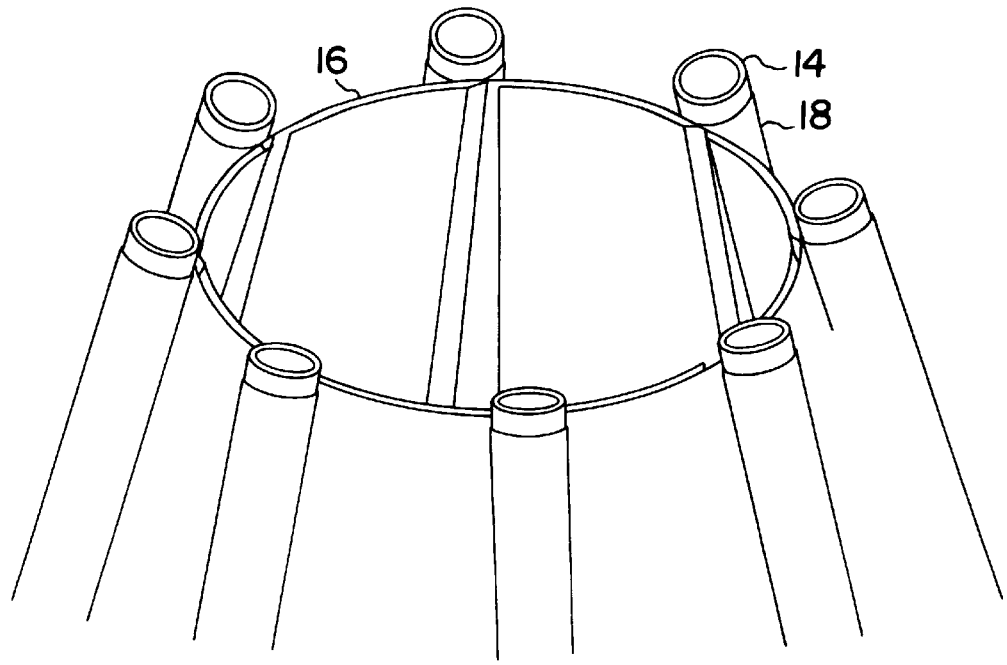
FIG. 4 is a perspective view of the bottom end of the reflector of FIG. 1 in the stowed configuration, drawn to a larger scale than FIGS. 1–3.

Returning to FIG. 1, a substantial portion of the length of ribs 14 fit within cylindrical pockets or sleeves 18 located on the rear surface and radially outwardly extending from hub 12. Those sleeves anchor the ribs to the reflective material 16. As seen in FIG. 4, which illustrates the bottom end of the reflector in the folded up or stowed position in an inverted perspective view drawn in an enlarged scale, sleeves 18 extend along the outer surface of reflective material 16 to the outer periphery, leaving a small portion of the end of ribs 14 protruding from the end of sleeve 18. In alternative embodiments, the end of the sleeve 18 may be sealed, forming a closed pocket, so that the rib end does not protrude. It should be noted that reference to a sleeve in this specification, subsumes a pocket within its meaning, the latter being no more than a sleeve with a closed end. As also illustrated in this figure, reflective material 16 as stowed is conveniently packed together in pleats, much like one's household drapes.

Figure 5:
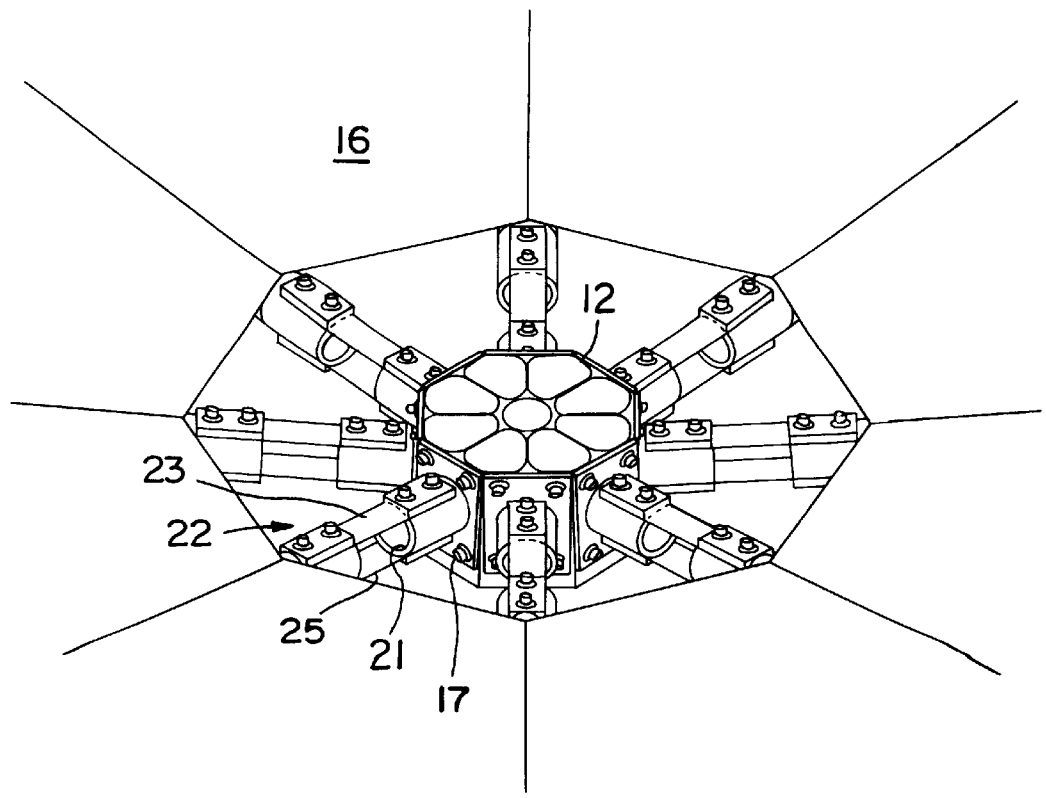
FIG. 5 is a perspective view of the central hub portion of the reflector illustrating the hinges as deployed, drawn to a larger scale than FIGS. 1–3.
Figure 6:
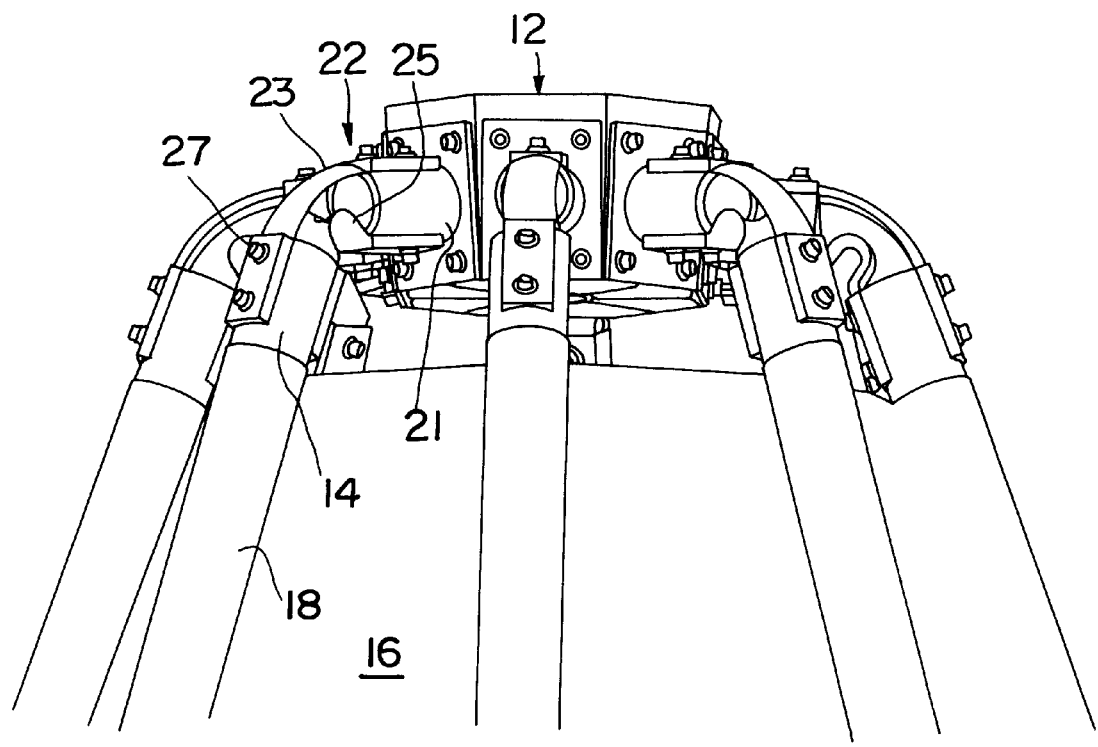
FIG. 6 is a view of the region in FIG. 5, illustrating the same region as folded.

The hub region is illustrated in larger scale in FIGS. 5 and 6, next considered, which depict the hub region in the deployed state and in the stowed state, respectively. In these figures like elements are identified by the same number used for the element in the prior figures and the description of those elements need not be repeated. Hub 12 is a multi-sided hollow container, and, in the illustrated embodiment contains eight sides. Each of the sides is closed by an attached panel 17 that supports by an end a stiff tubular mandrel 21 of the same diameter as the curved rib and at least two extending thin narrow concavely curve-shaped thin flexible members, 23 and 25, and those three elements define a deployment hinge 22. The flexible members are symmetrically positioned diametrically opposite one another relative to the tubular mandrel. The hub, ribs and tubular mandrel 21 are suitably formed from carbon graphite material. Alternatively, the hub and ribs may be formed of metal, such as steel, as long as proper electrical grounding and insulation is used.

In the preferred embodiment each of the flexible members 23 and 25 comprise a short stack of members of the prescribed shape, and being quite thin, individual members in each stack are not visible in the figure. The number of pieces used in each stack is dictated by the required deployment torque and latch up stiffness. In short, the greater the number of pieces in a stack, the greater the torque and stiffness. Thus, one, two or more pieces may be used in each stack. Flexible members 23 and 25 are typically formed of steel, manufactured from tape measure stock purchased, as example, from Sears Company.

Hinge 22 attaches to an associated one of the tubular ribs 14 by inserting a portion of the tubular rib 14 within the circular space defined by the inner cylindrically shaped concave surfaces of the pair of flexible members 23 and 25 and fastening the inside surfaces of the latter with screws 27 to the outer cylindrical surface of the rib with which the flexible members mate. This forms a suitable grip.

Deployment hinges 22 are of a recognized design known as strain energy or tape measure hinges. Those persons who use a metal tape measure are familiar with the metal tape's slightly curved shape, which affords some measure of stiffness along its length and sides. Yet with sufficient force the tape resiliently bends and folds.

The tape may be grasped along its length and, applying an appropriate level of force, manually folded over, causing the area about the fold to flex out and flatten. Once flattened, a lesser force enables further folding. Moreover, when the tape is released, the tape resiliently returns, springs back, to shape. The tape is both resilient and flexible. Hinges of the foregoing type have earlier been used on solar arrays. Hinges of the foregoing type have been previously used on satellites manufactured by the present assignee for deploying solar arrays, the panels of photovoltaic devices that convert sunlight to electrical current for recharging the satellite's batterys. When used on solar arrays the hinges are aligned like hinges on a swinging door.

Those tape measure hinges have the advantage of providing low positive torque during deployment, so that the deployment rate is not excessive, while providing much higher torque during the last few degrees of rotation prior to "latch up". The latched stiffness of that hinge is extremely high, that is, the force required to flatten or kink one of the curved members, permitting bending. The hinge's angle of deployment may be adjusted at the base of the fitting by using tapered shims or other like means to achieve the desired final angular orientation for the associated rib.

Returning to FIGS. 1 and 2, each of ribs 14 is a hollow tubular structure that is shaped into the desired parabolic curvature. When constructed of metal, the metal tubes are shaped with a tube bending mandrel. When constructed of carbon graphite, the carbon graphite tubes may be layed up using an internal mandrel, and may be either straight or tapered.

Preferably, reflective material 16 is a metal coated film material, such as Mylar® polyester film, a film material used in some electrical capacitors, in emergency blankets, and also used as the reflective surface in inflatable reflectors. It is believed that a large diameter inflatable reflector constructed by a third party was recently flown on the space shuttle as an experiment to determine the viability of the inflatable reflector concept. Such a material is thin, pliable, strong and very light in weight, and, in contrast to the woven materials, is non-porous. The material is very low in fabrication cost. The metal coating may be a separate layer that is bonded to the Mylar® polyester material, or may be applied to that material by conventional metal sputtering technique. In alternative embodiments, other metal coated membranes and fabrics, such as a metalized woven cloth, may be substituted.

To form the reflective material for assembly in the reflector, sheets of the material are cut to the requisite shapes which, when assembled together, either sewn or glued, form a parabolic surface of the desired size. As in manufacturing garments, such as a man's suit, the three dimensional parabolic surface is typically adequately defined by a number of two dimensional patterns. The formed patterns are laid over sheets of the material and a corresponding segment of the material is cut. Typically, the reflector requires a minimum of one pattern per section or "gore", where a gore is the section of the reflector located between each pair of ribs. The segments are then continuous seam heat joined, sewn together, glued or otherwise attached along their edges, creating seams 11 in FIG. 1, to form a reflective surface that can be expanded to a parabolic shape. It is seen that the embodiment of FIG. 1, is formed of eight such sections or gores. The formed reflector "garment" may be tested for accuracy to shape in the deployed condition by fitting the garment over a mandrel that is of the desired shape.

The tubular sleeves or pockets 18 are sewn to the back side of the reflector along lines radiating from the center for the ribs, preferably along the seam line 11 formed when joining together adjacent gores. They extend from the region of the hub, shown in FIG. 4, to the periphery of the material and are closed at that end, forming a pocket. The tubes are sufficient in diameter to allow the ribs to be inserted and extend through. In assembling the reflector, the curved ribs are inserted through the pockets, much like tent poles in a tent. When the tubes are deployed outward, the ribs pull on the pockets and the pockets pull on the reflective material making it taut and in the desired parabolic geometry.

Figure 7:
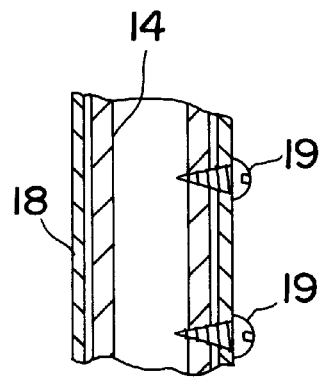
FIG. 7 is a partial section view of an ensleeved rib used in the embodiment of FIG. 1.

The membrane sleeves 18 are positively attached along the edges of each gore in the same manner that the gores are attached to one another. Preferably, the sleeves are formed of the same material used for reflective material 16. After assembly over the ribs, the sleeves may be attached at a plurality of discrete locations along the back of each rib, using screws 19 that are screwed through the sleeve material 18 into the rib 14, such as illustrated in a partial section view of an ensleeved rib in FIG. 7. Other fastening techniques may be alternatively used.

In a less preferred embodiment, a series of discrete loops may be substituted for the pockets. That is, each pocket may be replaced by a series of loops of string-like material sewn to the back side of reflective material 16 at discrete spaced locations along the gore seam to anchor the rib to material 16, functioning much like the belt loops on a pair of men's trousers. Unlike the sleeve or pocket, the loop arrangement is discontinuous, and appears at present to be less preferred.

The foregoing structure provides for a very inexpensive integration of the reflective surface to the support ribs and for the attachment of the ribs to the base or hub. The membrane surface is much less expensive than the traditional welded or knitted mesh surfaces used in the prior reflector designs. And the manufacturing cost of the hinges and their assembly is lower than the corresponding hinges used in the prior antenna design.

In hindsight, our invention may be viewed as a collection of different known component designs that are adapted into a single combination of great practicality, the unique combination of usefulness and low cost that makes the reflector attractive and economically available to the largest possible base of users.

For RF communications at P-band frequencies, the antennas selected were of the Yagi-type, containing a radiating element and multiple reflector elements spaced apart and oriented in parallel. An ordinary television antenna is an example of the Yagi type. The present invention offers a parabolic reflector at that band and, hence, a parabolic antenna, with its attendant advantages. It is especially well suited for P-band radar applications, where it produces a higher gain than is attainable with Yagi-type antennas. The present invention recognizes that at P-band, the RF wavelength is very large, relative to the higher microwave frequencies at which the parabolic antenna is customarily used. Because of that minor roughness or variation in the reflector surface does not significantly alter the antenna's performance. Thus a minimum number of supporting ribs may be used to form the reflector, minimizing the manufacturing cost.

At frequencies above P-band, where the distance between ribs is a significant portion of the wavelength, the surface shape's departure from the theoretical parabolic shape in the eight rib embodiment described, results in significant loss of gain, making the embodiment unattractive. However, the foregoing embodiment may be slightly modified to correct the shape, allowing acceptable performance levels at those higher RF frequencies. Thin flexible circularly curved rods, suitably of graphite, would be inserted in additional fabric-formed pockets oriented transverse to the described pockets.

Each rod is of a shape over its length that is a portion of the perimeter of a circle, sufficient in length to cover an arcuate span of about three of the parabolic shaped ribs. Likewise the additional pockets are sewn on the back side of the reflector. The foregoing supplemental ribs and pockets may be positioned at the mid-point of the radially extending ribs and pockets earlier described in the principal embodiment. The additional ribs form additional shaping of the reflective material when the latter is placed in the deployed condition. Because each of the supplemental ribs spans three or fewer of the radially extending ribs, they cannot prevent the reflector from being folded up, although the collapsed package would be slightly less streamlined in that condition compared to the principal embodiment.

In still other embodiments, higher frequency capability may be obtained by increasing the number of ribs from, say eight, as in the illustrated embodiment, to twelve, sixteen or more ribs. In such an embodiment the gore of material is of smaller size and, when all gores are combined together, the formed surface more closely approximates the parabolic shape than the one constructed with only eight gores. As is apparent, the manufacturing cost of the latter embodiments is greater, since the antenna contains a greater number of component parts.

For completeness, brief mention may be made of the deployment mechanics. Once assembled, the antenna is manually placed in the folded-down position and the bottom end is tied or restrained with a cable, not illustrated, preventing the mechanical bias provided by the hinges from deploying the reflector. As is a conventional practice, a remotely controlled cable cutting mechanism, also not illustrated, is associated with that cable. When the reflector is carried into space and is to be deployed, upon command, that cutting mechanism burns or cuts the cable. The spring force in the hinges then opens and deploys the reflector.

The foregoing reflector was described in connection with its capability of reflecting RF energy. The metal surface of the reflective surface is recognized as being reflective also to visible light. Light striking any portion of the surface is also concentrated at the paraboloid's focal point. Thus the reflector may also be applied as a low cost solar concentrator for solar heating apparatus in which the concentrated light is used to heat a thermal substance located at the focal point.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A deployable reflector, comprising:
   pliant reflective material defining a reflective parabolic surface when deployed, said pliant reflective material being symmetrically configured about a central opening and having a circular outer periphery when deployed, said pliant reflective material having a front side for reflecting energy and a backside;
   a hub, said hub located in said central opening in said pliant reflective material;
   a plurality of ribs of predetermined length evenly distributed about said hub, said ribs being of a parabolic shape along said predetermined length;
   a corresponding plurality of strain energy hinge means, each of said strain energy hinge means for connecting an end of a respective one of said plurality of ribs to said hub to bias said ribs for pivotal movement relative to said hub from a folded position alongside the axis of said hub to a deployed position radially outwardly extending from said hub and for holding said ribs in said deployed position; and
   a plurality of rib anchoring means, each of said rib anchoring means for anchoring a respective one of said plurality of ribs to the backside of said material, each said plurality of rib anchoring means comprising a tubular sleeve, each of said tubular sleeves for ensleeving a portion of a respective one of said ribs, said tubular sleeves being attached to said backside of said material and extending from said central opening radially outwardly to said periphery, wherein said ribs pull on said anchoring means to deploy and hold said material in a generally parabolic configuration when said ribs are pivoted to said deployed position, wherein said ribs pull sideways on said tubular sleeves to deploy and hold said material in a generally parabolic configuration, when said ribs are pivoted to said deployed position.

2. The invention as defined in claim 1, wherein said tubular sleeves comprise a material that is the same pliant reflective material constituting said reflective parabolic surface.

3. The invention as defined in claim 1, wherein said tubular sleeves comprise an electrically non-conductive fabric material, and wherein said hub and said ribs comprise an electrically non-conductive material.

4. The invention as defined in claim 1, wherein said strain energy hinge means comprises:
   first and second stacks of thin flexible members of first predetermined length, each having a cross section defining a circularly curved section of less than a semi-circle, and having a concave curved inner surface and convex curved outer surface;
   a circular mandrel for connection to said hub, said circular mandrel being of a second predetermined length, less than said first predetermined length, and having a circular outer surface, said circular outer surface being of a size that mates to said concave inner surface of said stack of thin flexible members;

said first and second stacks of thin flexible members being oriented coaxially with said circular mandrel and being attached to diametrically opposite portions thereof and symmetrically positioned thereon, wherein an end portion of each of said first and second stacks of thin flexible members overhangs said circular mandrel to form a grip for holding an end of a respective rib in spaced relation with an end of said circular mandrel, whereby a portion of said stacks of thin flexible members, located between said end of said rib and the end of said circular mandrel, is permitted to resiliently flex upon pivotal movement of said rib to the folded position and produce a biasing force to pivot said rib back to said deployed position.

5. The invention as defined in claim 2, wherein said strain energy hinge comprises:

first and second thin flexible members of first predetermined length, each having a cross section defining a circularly curved section of less than a semi-circle, and having a concave curved inner surface and convex curved outer surface;

a circular mandrel for connection to said hub, said circular mandrel being of a second predetermined length, less than said first predetermined length, and having a circular outer surface, said circular outer surface being of a size that mates to said concave inner surface of said thin flexible members;

said first and second thin flexible members being oriented coaxially with said circular mandrel and being attached to diametrically opposite portions thereof and symmetrically positioned thereon, wherein an end portion of each of said first and second thin flexible members overhangs said circular mandrel to form a grip for holding an end of a respective rib in spaced relation with an end of said circular mandrel, whereby a portion of said thin flexible members located between said end of said rib and the end of said circular mandrel, is permitted to resiliently flex upon pivotal movement of said rib to the folded position and produce a biasing force to pivot said rib back to said deployed position.

6. A deployable reflector, comprising:

pliant reflective material defining a reflective parabolic surface when deployed, said pliant reflective material comprising a metal coated film material being symmetrically configured about a central opening and having a circular outer periphery when deployed, said pliant reflective material having a front side for reflecting energy and a backside;

a hub, said hub located in said central opening in said pliant reflective material;

a plurality of ribs of predetermined length evenly distributed about said hub, said ribs being of a parabolic shape alone said predetermined length;

a corresponding plurality of strain energy hinge means, each of said strain energy hinge means for connecting an end of a respective one of said plurality of ribs to said hub to bias said ribs for pivotal movement relative to said hub from a folded position alongside the axis of said hub to a deployed position radially outwardly extending from said hub and for holding said ribs in said deployed position; and a plurality of rib anchoring means, each of said rib anchoring means for anchoring a respective one of said plurality of ribs to the backside of said material, wherein said ribs pull on said anchoring means to deploy and hold said material in a generally parabolic configuration when said ribs are pivoted to said deployed position.

7. The invention as defined in claim 6, wherein said metal coated film material comprises a polyester film material.

8. A deployable reflector, comprising:

pliant reflective material defining a reflective parabolic surface when deployed, said pliant reflective material being symmetrically configured about a central opening and having a circular outer periphery when deployed, said pliant reflective material having a front side for reflecting energy and a backside;

a hub, said hub located in said central opening in said pliant reflective material;

a plurality of ribs of predetermined length evenly distributed about said hub, said ribs being of a parabolic shape along said predetermined length and comprised of a graphite carbon material;

a corresponding plurality of strain energy hinge means, each of said strain energy hinge means for connecting an end of a respective one of said plurality of ribs to said hub to bias said ribs for pivotal movement relative to said hub from a folded position alongside the axis of said hub to a deployed position radially outwardly extending from said hub and for holding said ribs in said deployed position; and a plurality of rib anchoring means, each of said rib anchoring means for anchoring a respective one of said plurality of ribs to the backside of said material, wherein said ribs pull on said anchoring means to deploy and hold said material in a generally parabolic configuration when said ribs are pivoted to said deployed position.

9. A deployable reflector, comprising:

pliant reflective material defining reflective parabolic surface when deployed, said pliant reflective material being symmetrically configured about a central opening and having a circular outer periphery when deployed, said pliant reflective material having a front side for reflecting energy and a backside;

a hub, said hub located in said central opening in said pliant reflective material;

a plurality of ribs of predetermined length evenly distributed about said hub, said ribs being comprised of a metal and being of a parabolic shape along said predetermined length;

a corresponding plurality of strain energy hinge means, each of said strain energy hinge means for connecting an end of a respective one of said plurality of ribs to said hub to bias said ribs for pivotal movement relative to said hub from a folded position alongside the axis of said hub to a deployed position radially outwardly extending from said hub and for holding said ribs in said deployed position; and a plurality of rib anchoring means, each of said rib anchoring means for anchoring a respective one of said plurality of ribs to the backside of said material, wherein said ribs pull on said anchoring means to deploy and hold said material in a generally parabolic configuration when said ribs are pivoted to said deployed position.

10. A deployable reflector, comprising:

pliant reflective material defining a reflective parabolic surface when deployed, said pliant reflective material being symmetrically configured about a central opening and having a circular outer periphery when deployed, said pliant reflective material having a front side for reflecting energy and a backside;

a hub, said hub located in said central opening in said pliant reflective material;

a plurality of ribs of predetermined length evenly distributed about said hub, said ribs being of a parabolic shape along said predetermined length;

a corresponding plurality of strain energy hinge means, each of said strain energy hinge means for connecting an end of a respective one of said plurality of ribs to said hub to bias said ribs for pivotal movement relative to said hub from a folded position alongside the axis of said hub to a deployed position radially outwardly extending from said hub and for holding said ribs in said deployed position; and a plurality of rib anchoring means, each of said rib anchoring means for anchoring a respective one of said plurality of ribs to the backside of said material, wherein said ribs pull on said anchoring means to deploy and hold said material in a generally parabolic configuration when said ribs are pivoted o said deployed position, each of said plurality of rib anchoring means comprising a series of loops of pliant material, spaced from one another along the length of a respective one of said plurality of ribs.

11. A deployable reflector, comprising:

pliant reflective material defining a reflective parabolic surface when deployed, said pliant reflective material being symmetrically configured about a central opening and having a circular outer periphery when deployed, said pliant reflective material having a front side for reflecting energy and a backside;

a hub, said hub located In said central opening in said pliant reflective material;

a plurality of ribs of predetermined length evenly distributed about said hub, said ribs being of a parabolic shape along said predetermined length;

a corresponding plurality of strain energy hinge means, each of said strain energy hinge means for connecting an end of a respective one of said plurality of ribs to said hub to bias said ribs for pivotal movement relative to said hub from a folded position alongside the axis of said hub to a deployed position radially outwardly extending from said hub and for holding said ribs in said deployed position, each of said strain energy hinge means comprising:

first and second stacks containing a plurality of nested thin flexible members of first predetermined length, each having a cross section defining a circularly curved section of less than a semi-circle, and having a concave curved inner surface and convex curved outer surface; and a circular mandrel for connection to said hub, said circular mandrel being a second predetermined length, less than said first predetermined length, and having a circular outer surface, said circular outer surface being of a size that mates to said concave inner surface of said stack of thin flexible members;

said first and second stack of thin flexible members being oriented coaxially with said circular mandrel and being attached to diametrically opposite portions thereof and symmetrically positioned thereon, wherein an end portion of each of said first and second stack of thin flexible members overhangs said circular mandrel to form a grip for holding an end of a respective rib in spaced relation with an end of said circular mandrel, whereby a portion of said stack of thin flexible members located between said end of said rib and the end of said circular mandrel, is permitted to resiliently flex upon pivotal movement of said rib to the folded position and produce a biasing force to pivot said rib back to said deployed position; and a plurality of rib anchoring means, each of said rib anchoring means for anchoring a respective one of said plurality of ribs to the backside of said material, wherein said ribs pull on said anchoring means to deploy and hold said material in a generally parabolic configuration when said ribs are pivoted to said deployed position.

12. A deployable reflector, comprising:

pliant reflective material defining a reflective parabolic surface when deployed, said pliant reflective material begin symmetrical configured about a central opening and having a circular outer periphery when deployed, said pliant reflective material having a front side for reflecting energy and a backside;

a hub, said hub located in said central opening in said pliant reflective material;

a plurality of ribs of predetermined length evenly distributed about said hub, said ribs being of a parabolic shape alone said predetermined length;

a corresponding plurality of strain energy hinge means, each of said strain energy hinge means for connecting an end of a respective one of said plurality of ribs to said hub to bias said ribs for pivotal movement relative to said hub from a folded position alongside the axis of said hub to a deployed position radially outwardly extending from said hub and for holding said ribs in said deployed position, each of said strain energy hinge means comprising:

first and second thin flexible member of first predetermined length, each having a cross section defining a circularly curved section of less than a semi-circle, and having a concave curved inner surface and convex curved outer surface;

a circular mandrel for connection to said hub, said circular mandrel being of a second predetermined length, less than said first predetermined length, and having a circular outer surface, said circular outer surface being of a size that mates to said concave inner surface of said thin flexible members;

said first and second thin flexible members being oriented coaxially with said circular mandrel and being attached to diametrically opposite portions thereof and symmetrically positioned thereon, wherein an end portion of each of said first and second thin flexible members overhangs said circular mandrel to form a grip for holding an end of a respective rib in spaced relation with an end of said circular mandrel, whereby a portion of said thin flexible members located between said end of said rib and the end of said circular mandrel, is permitted to resiliently flex upon pivotal movement of said rib to the folded position and produce a biasing force to pivot said rib back to said deployed position; and a plurality of rib anchoring means, each of said rib anchoring means for anchoring a respective one of said plurality of ribs to the backside of said material, wherein said ribs pull on said anchoring means to deploy and hold said material in a generally parabolic configuration when said ribs are pivoted to said deployed position.

13. A deployable reflector comprising:

a reflective pliant non-porous metal coated thin film material defining a parabolic surface when deployed said metal coated film material being symmetrically configured about a central opening and having a circular outer peripheral edge when deployed, said film material having a front side for reflecting energy and a backside;

a hub, said hub being located in said central opening;

a plurality of ribs being of predetermined length evenly distributed about said hub, said ribs being of a parabolic shape along said predetermined length and comprising a carbon graphite material;

a corresponding plurality of strain energy hinge means, each of said strain energy hinge means for connecting an end of a respective one of said plurality of ribs to said hub to bias said ribs for pivotal movement relative to said hub from a folded position alongside the axis of said hub to a deployed position radially outwardly extending from said hub and holding said rib in said deployed position;

a plurality of tubular sleeves, comprising a thin film material, each of said tubular sleeves for ensleeving a respective one of said plurality of ribs, said tubular sleeves being attached to said backside of said film material and extending from said central opening radially outwardly to said peripheral edge, wherein said ribs pull sideways on said tubular sleeves to deploy and hold said material in a generally parabolic configuration when said ribs are pivoted to said deployed position;

each of said strain energy hinge means further comprising:

first and second thin flexible members of first predetermined length, each having a cross section defining a circularly curved section of less than a semi-circle, and having a concave curved inner surface and convex curved outer surface;

a circular mandrel for connection to said hub, said circular mandrel being of a second predetermined length, less than said first predetermined length, and having a circular outer surface, said circular outer surface being of a size that mates to said concave inner surface of said thin flexible members; and said first and second thin flexible members being oriented coaxially with said circular mandrel and being attached to diametrically opposite portions thereof and symmetrically positioned thereon, wherein an end portion of each of said first and second thin flexible members overhangs said circular mandrel to form a grip for holding an end of a respective rib in spaced relation with an end of said circular mandrel, whereby a portion of said thin flexible members located between said end of said rib and the end of said circular mandrel, is permitted to resiliently flex upon pivotal movement of said rib to the folded position and produce a biasing force to pivot said rib back to said deployed position.

14. A deployable reflector comprising:

a thin reflective pliant non-porous membrane of metal coated material defining a parabolic surface when deployed, said membrane being symmetrically configured about a central circular opening and having a circular outer peripheral edge when deployed, said membrane containing a front side for reflecting energy and a backside;

a hub, said hub being located within said central opening;

a plurality of ribs being of predetermined length evenly distributed about said hub, said ribs being of a parabolic shape along said predetermined length and comprising a carbon graphite material;

a corresponding plurality of strain energy hinge means, each of said strain energy hinge means for connecting an end of a respective one of said plurality of ribs to said hub to bias said ribs for pivotal movement relative to said hub from a folded position alongside the axis of said hub to a deployed position radially outwardly extending from said hub and holding said ribs in said deployed position;

said strain energy hinge means further comprising:

first and second stacks of thin flexible members of a first predetermined length, each having a cross section defining a circularly curved section of less than a semi-circle, and having a concave curved inner surface and convex curved outer surface;

a circular mandrel for connection to said hub, said circular mandrel being of a second predetermined length, less than said first predetermined length, and having a circular outer surface, said circular outer surface being of a size that mates to said concave inner surface of said stacks of thin flexible members;

said first and second stacks of thin flexible members being oriented coaxially with said circular mandrel and being attached to diametrically opposite portions thereof and being symmetrically positioned thereon, wherein an end portion of each of said first and second stacks of thin flexible members overhang a portion of said circular mandrel to form a grip for holding an end of a respective rib in spaced relation with an end of said circular mandrel, whereby a portion of said stacks of thin flexible members, located between said end of said rib and the end of said circular mandrel, is permitted to resiliently flex upon pivotal movement of said rib to the folded position and produce a biasing force to pivot said rib back to said deployed position;

a plurality of tubular sleeves, comprising metal coated polyester material, each of said tubular sleeves for ensleeving a portion of a respective one of said ribs, said tubular sleeves being attached to said backside of said material and extending from said central opening radially outwardly to said peripheral edge, wherein said ribs pull sideways on said tubular sleeves to deploy and hold said material in a generally parabolic configuration when said ribs are pivoted to said deployed position; and a plurality of screws associated with each of said plurality of sleeves, said plurality of screws extending through an associated sleeve and into a rib located within said associated sleeve to permanently fasten said rib to said sleeve.

15. A reflector for a P-band antenna, comprising:

pliant reflective material defining a reflective parabolic surface when deployed, said pliant reflective material being symmetrically configured about a central opening and having a circular outer periphery when deployed, said pliant reflective material having a front side for reflecting energy and a backside;

a hub, said hub located in said central opening in said pliant reflective material;

a plurality of ribs of predetermined length evenly distributed about said hub, said ribs being of a parabolic shape along said predetermined length;

a corresponding plurality of strain energy hinge means, each of said strain energy hinge means for connecting an end of a respective one of said plurality of ribs to said hub to bias said ribs for pivotal movement relative to said hub from a folded position alongside the axis of said hub to a deployed position radially outwardly extending from said hub and for holding said ribs in said deployed position; and a plurality of rib anchoring means, each of said rib anchoring means for anchoring a respective one of said plurality of ribs to the backside of said material, each said plurality of rib anchoring means comprising a tubular sleeve, each of said tubular sleeves for ensleeving a portion of a respective one of said ribs, said tubular sleeves being attached to said backside of said material and extending from said central opening radially outwardly to said periphery, wherein said ribs pull on said anchoring means to deploy and hold said material in a generally parabolic configuration when said ribs are pivoted to said deployed position and wherein said ribs pull sideways on said tubular sleeves to deploy and hold said material in a generally parabolic configuration, when said ribs are pivoted to said deployed position.

16. The P-band antenna reflector as defined in claim 15, wherein each of said strain energy hinge means comprises:

first and second stacks containing a plurality of nested thin flexible members of first predetermined length, each having a cross section defining a circularly curved section of less than a semi-circle, and having a concave curved inner surface and convex curved outer surface;

a circular mandrel for connection to said hub, said circular mandrel being of a second predetermined length, less than said first predetermined length, and having a circular outer surface, said circular outer surface being of a size that mates to said concave inner surface of said stack of thin flexible members;

said first and second stack of thin flexible members being oriented coaxially with said circular mandrel and being attached to diametrically opposite portions thereof and symmetrically positioned thereon, wherein an end portion of each of said first and second stack of thin flexible members overhangs said circular mandrel to form a grip for holding an end of a respective rib in spaced relation with an end of said circular mandrel, whereby a portion of said stack of thin flexible members located between said end of said rib and the end of said circular mandrel, is permitted to resiliently flex upon pivotal movement of said rib to the folded position and produce a biasing force to pivot said rib back to said deployed position.

* * * * *